US005727430A

United States Patent [19]
Valente

[11] Patent Number: 5,727,430
[45] Date of Patent: Mar. 17, 1998

[54] LOCKING DIFFERENTIAL INCLUDING FRICTION PACK CLUTCH MEANS

[75] Inventor: Paul J. Valente, Berkely, Mich.

[73] Assignee: Dyneer Corporation, Warren, Mich.

[21] Appl. No.: 736,480

[22] Filed: Oct. 24, 1996

[51] Int. Cl.[6] ............................................. F16H 48/12
[52] U.S. Cl. ........................................... 74/650; 475/248
[58] Field of Search ................... 74/650; 475/248, 475/249

[56] References Cited

U.S. PATENT DOCUMENTS

| | | | |
|---|---|---|---|
| 2,555,044 | 5/1951 | Lewis | 74/650 |
| 4,400,996 | 8/1983 | Schou | 74/650 |
| 4,498,355 | 2/1985 | Schou | 74/650 |
| 4,513,633 | 4/1985 | Goscenski, Jr. | 74/650 |
| 4,640,143 | 2/1987 | Schou | 74/650 |
| 4,735,108 | 4/1988 | Teraoka et al. | 74/650 |
| 4,949,594 | 8/1990 | Galhotra | 74/650 |
| 5,037,362 | 8/1991 | Teraoka et al. | 475/249 X |
| 5,176,591 | 1/1993 | Krisher | 475/248 X |
| 5,413,015 | 5/1995 | Zentmyer | 74/650 |
| 5,458,547 | 10/1995 | Teraoka et al. | 475/249 |
| 5,590,572 | 1/1997 | Valente | 74/650 |
| 5,624,346 | 4/1997 | Hirota | 475/249 |

*Primary Examiner*—Khoi Q. Ta
*Assistant Examiner*—Peter T. Kwon
*Attorney, Agent, or Firm*—Laubscher & Laubscher

[57] ABSTRACT

A locking differential includes annular friction pack clutch assemblies for normally connecting the drive shaft of a vehicle to a pair of axially aligned driven axle shafts. A pair of clutch members are biased apart by a plurality of spring assemblies exch including a locking pin colinearly arranged relative to a helical spring. At one end, the locking pin is slidably mounted in a corresponding pin bore contained in one face of a first clutch member, the other end of the locking pin extending within an oversized spring bore contained in the opposing face of a second clutch member. The helical spring is mounted in the bottom of the oversized bore and is compressed by the pin when the pin is releasably retained in an extended operable position by a removable fastener member, thereby to compress the friction packs between the clutch members and the adjacent casing internal wall surfaces. When one driver shaft overruns the other by a given amount, the associated friction clutch is disengaged to disconnect the overrunning shaft from the differential.

18 Claims, 5 Drawing Sheets

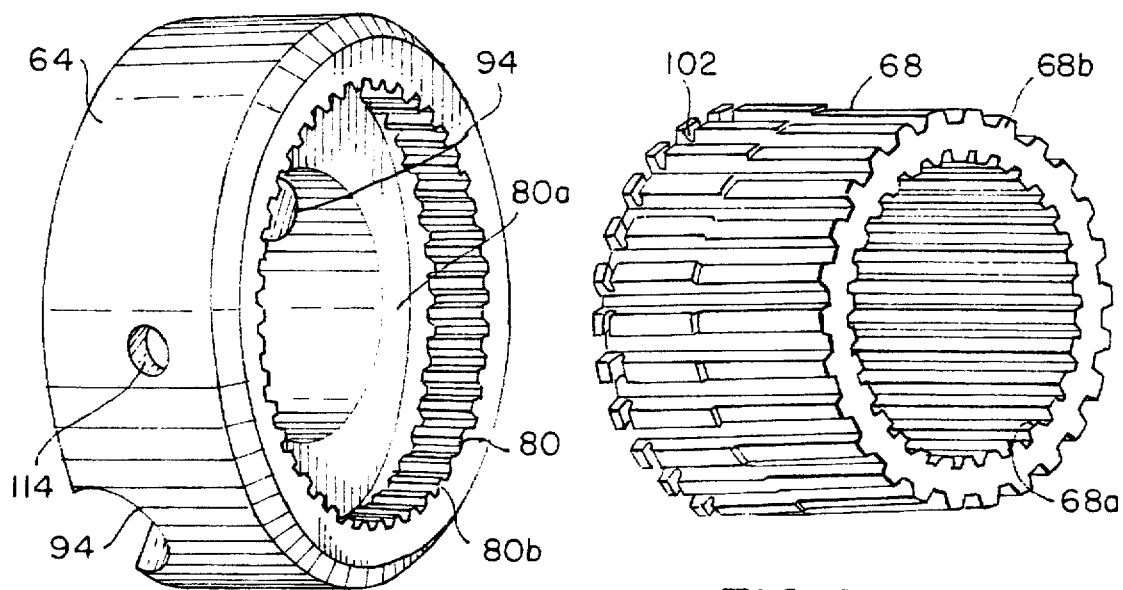
FIG. 8
FIG. 9
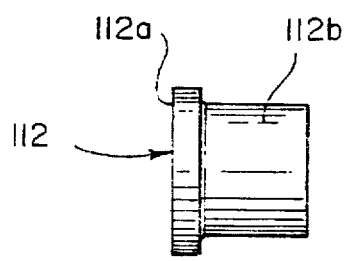
FIG. 10
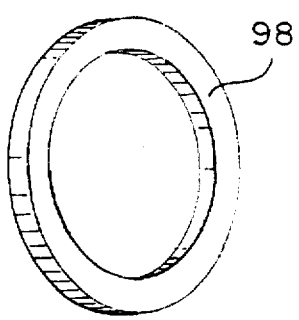
FIG. 11
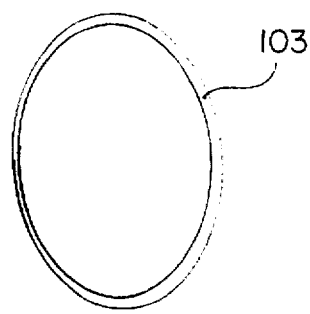
FIG. 12

LOCKING DIFFERENTIAL INCLUDING FRICTION PACK CLUTCH MEANS

BACKGROUND OF THE INVENTION

1. Field of the Invention

A locking differential is provided having annular friction pack clutch means for connecting the drive shaft of a motor-driven vehicle to a pair of output shafts or axles. Two collinearly arranged annular clutch members are normally biased apart by a plurality of spring assemblies each including a locking pin and a collinearly arranged helical spring. The locking pin is slidably mounted at one end in a bore contained in one face of a first clutch member and extends at its other end into an oversized bore contained in the opposed face of the other clutch member. The spring is mounted in the bottom of the oversized bore and is compressed by the pin when the pin is maintained in an extended operative position relative to the first clutch member by a removable fastener or clip, thereby to afford limited angular rotational movement of one clutch member relative to the other.

2. Brief Description of the Prior Art

Locking differentials are well known in the patented prior art, as shown by the patents to Lewis U.S. Pat. No. 2,555,044, Schou U.S. Pat. Nos. 4,400,996, 4,498,355 and 4,640,143, and Zentmyer U.S. Pat. No. 5,413,015. In the Schou patents, it was proposed to provide a pair of annular friction pack assemblies for normally connecting the drive shaft with the pair of output shafts, respectively. Upon the occurrence of an overrunning condition in which the rotational velocity of one output shaft exceeds that of the other shaft, the friction pack associated with the overrunning shaft is disengaged, thereby to disconnect the overrunning shaft to a free-wheeling condition. In the Zentmyer patent, it was proposed to retrofit a locking differential into the conventional differential casing of a four-wheel vehicle or the like, thereby to permit rugged off-road operation of the vehicle.

The present invention was developed to provide an improved speed-sensitive differential that may be retrofit into a standard open differential case. By using friction pack clutch means, a smoother engaging and disengaging locking differential is provided that avoids the bothersome ratcheting and clicking noise associated with the standard tooth-type locking differentials. Furthermore, the possibility of gear tooth chipping is avoided, whereby the life and dependability of the differential are improved.

SUMMARY OF THE INVENTION

Accordingly, it is a primary object of the present invention to provide a locking differential that is adapted to be retrofit into an existing differential casing, such as the original equipment differential casing of a four-wheel drive vehicle or the like, through an access opening contained therein, said differential including a pair of annual friction packs for normally connecting a drive shaft with a pair of driven output shafts. Side gears splined to the output shafts are normally connected with a pair of clutch or coupler members driven by the drive shaft by the friction packs, respectively. The clutch members are biased apart by a plurality of spring biasing assemblies each including a locking pin and a collinearly arranged helical spring, the locking pin being slidably mounted at one end in a bore contained in one face of a first clutch member, said pin extending at its other end in an oversized bore contained in the opposing face of the other clutch member, thereby to permit limited relative angular displacement between the clutch members. The spring is arranged in the bottom of the oversized bore for compression by the spring when the spring is maintained by a removable clip in an operable extended position relative to its bore in the first clutch member.

A more specific object of the invention is to provide in the first clutch member a radially-extending pin access opening communicating with the bottom of the pin bore, thereby to permit manual displacement of the pin from a retracted inoperable position in the bore to the extended operable position in which the other pin end extends into the oversized spring opening contained in the opposing face of the other clutch member. Preferably, the end of the locking pin adjacent the bottom of the bore is chamfered, thereby to permit displacement of the pin by the tip of a screwdriver inserted through the pin access opening. A retaining element such as an E-clip or a C-clip is mounted in a circumferential groove contained in the circumference of the pin to maintain the locking pin in the operative position against the force of the spring. The springs have sufficient biasing force to compress each friction pack between the associated clutch member and the adjacent casing internal wall surface, thereby to engage the friction pack to connect the associated side gear with the clutch member.

According to a further object of the invention, the adjacent faces of the clutch members contain diametrically arranged drive grooves that receive the drive rod the ends of which are connected with the differential case. Preferably, each drive groove has a generally U-shaped crossectional configuration. Spacer washers concentrically mounted within the clutch members between the drive rod and the adjacent end of the associated side gear prevent inward axial displacement of the side gears. In one embodiment, outward axial displacement of the side gears is prevented by a split circular member such as a wire ring mounted in an outer circumferential groove of the side gear for reaction with the adjacent end of the associated annular friction pack, and in a second embodiment, relative outward axial displacement of the side gears is prevented by the cooperation between external integral side gear flange portions and the respective annual friction packs.

BRIEF DESCRIPTION OF THE DRAWINGS

Other objects and advantages of the invention will become apparent from a study of the following specification when viewed in the light of the accompanying drawings in which:

FIGS. 7 and 8 are top and bottom perspective views of one of the clutch members of FIG. 3;

FIG. 9 is a perspective bottom view of one of the side gears of FIG. 3;

FIG. 10 is an side elevation view of the spring cap member of FIG. 3;

FIGS. 11 and 12 are perspective views of the annular shim and split wire ring members of FIG. 3;

DETAILED DESCRIPTION

Figure 1:
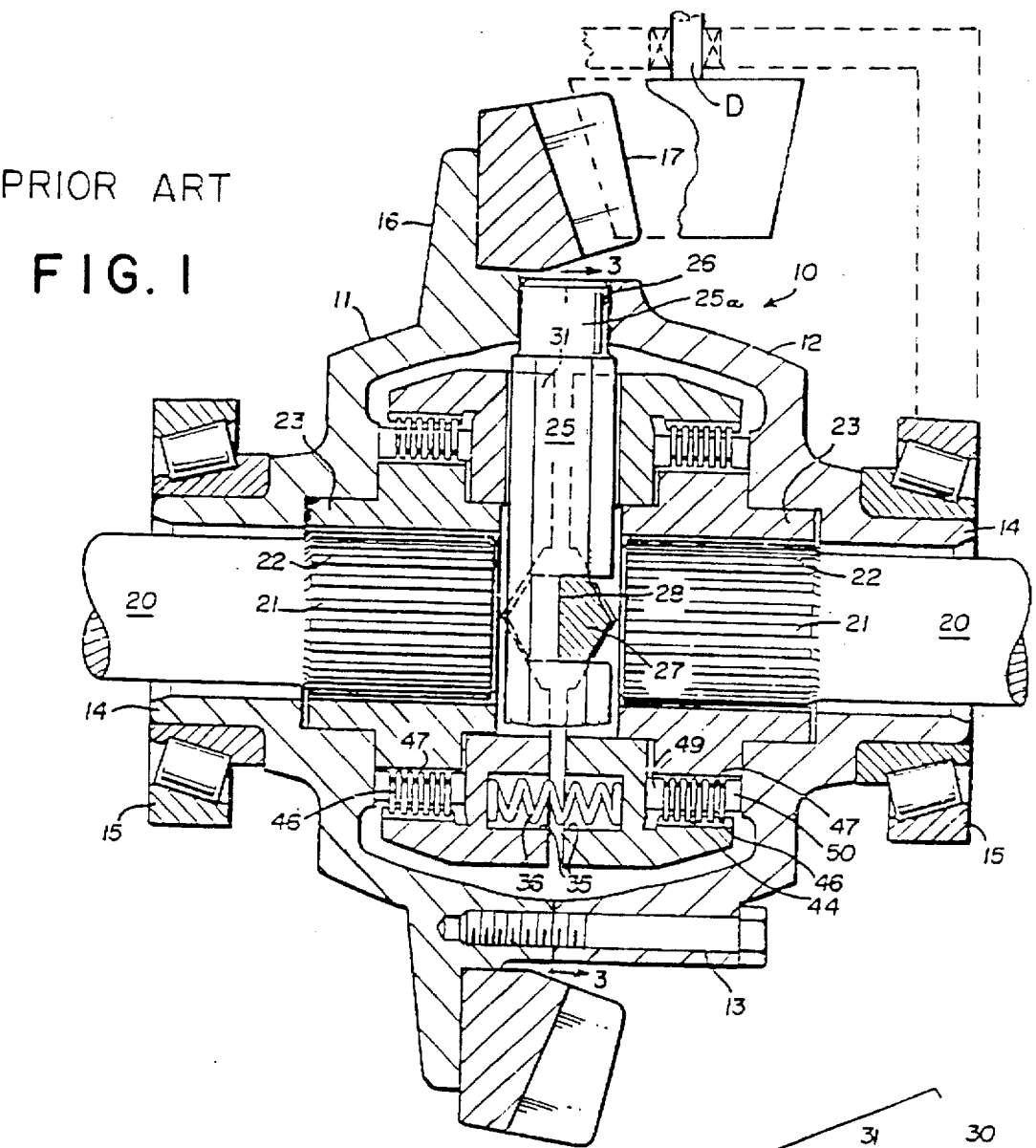
FIGS. 1 and 2 are side elevation and exploded perspective views, respectively, of the prior art differential of the Schou patent U.S. Pat. No. 4,498,355.
Figure 2:
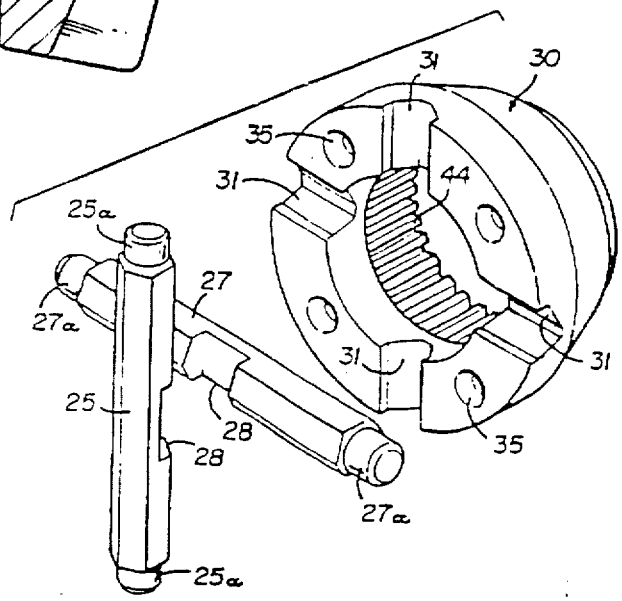

Referring first to the self locking differential shown in the Schou U.S. Pat. No. 4,498,355, the annular friction packs 46 serve to normally connect the collars or side gears with the couplers or clutch members 30 when the output axles 20 are driven at the same rotational velocities by the drive shaft D. Springs 36 normally bias the coupling rings 30 apart to compress the friction packs 46 between the coupling rings and the outer anvil rings 50 that engage the inner wall surface of the differential case 10. In the event that either of the two wheel axles 20 speeds up relative to the other wheel axle and the housing, that overrunning axle is momentarily disengaged from and is permitted to freewheel relative to the differential. This is accomplished by the faster moving axle causing its coupling ring to angularly advance relative to the drive rods 25 and 27. Meanwhile, the other coupling ring remains in contact with the drive rod and is driven as before. This relieves the pressure of the rods against the sloped walls of the ring notches and the ring immediately moves inwardly towards the rod. Now that the angularly advanced coupling ring is disengaged from the rods and moves inwardly toward the other ring, the pressure on that ring against its clutch is relieved so that the clutch immediately disengages and the axle collar with the axle are free to rotate or free-wheel without receiving any power from the differential; however, the other axle receives the power. Locking pin means extend with oversized holes contained in the opposed faces of the coupling members to limit the degree of relative angular displacement between the coupling members. When the overrunning condition is terminated, the overrunning coupling ring is returned to its initial position, and the axles are again driven at the same rotational velocity.

Figure 3:
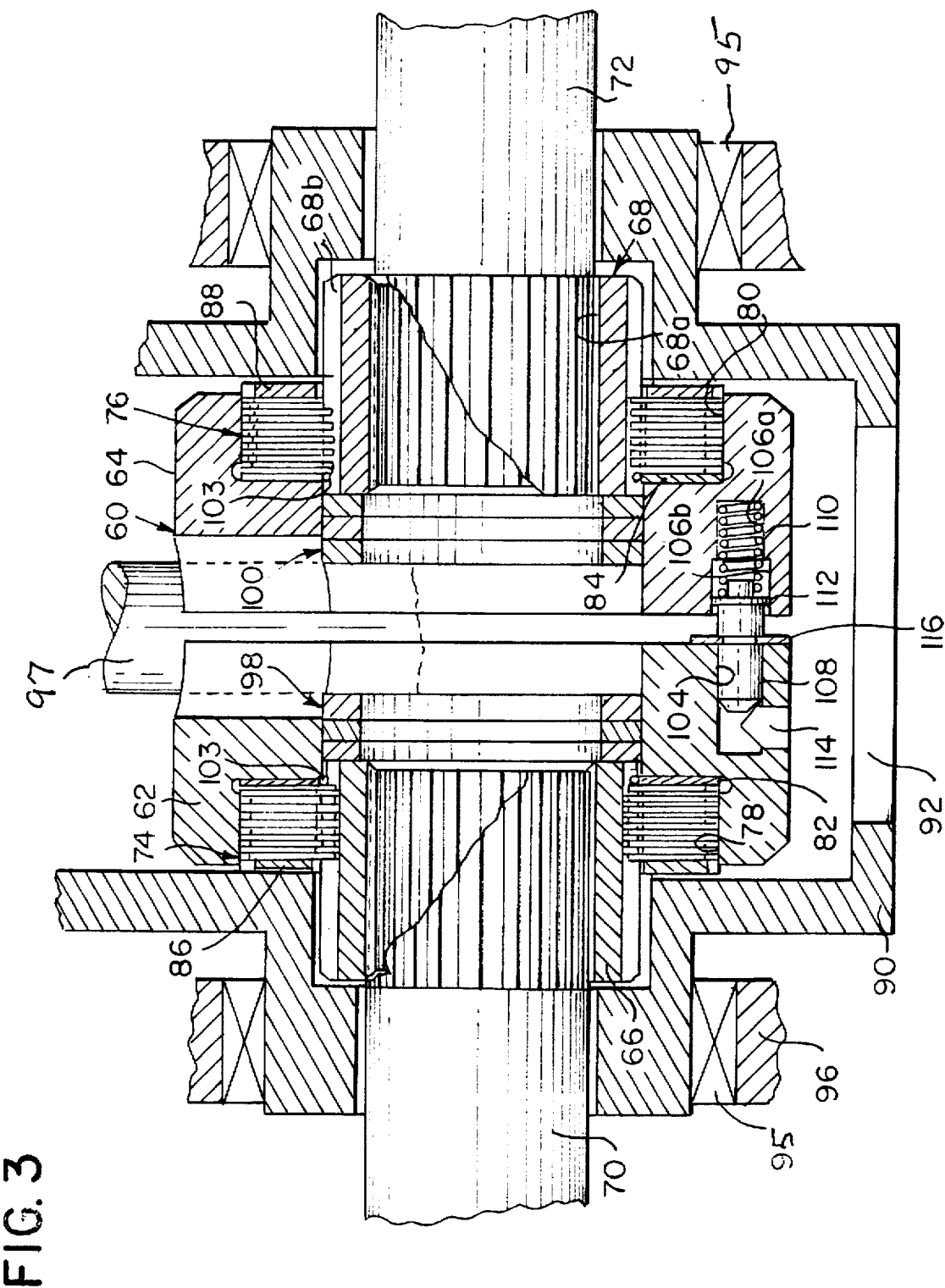
FIG. 3 is a sectional view of the improved differential of the present invention taken along line 3—3 of FIG.7.

Referring now to FIG. 3, the locking differential 60 of the present invention includes a pair of annular collinearly arranged clutch or coupling members 62 and 64 that are concentrically arranged about the adjacent ends of a pair of collinearly arranged annular side gears 66 and 68, respectively. The side gears are internally splined for nonrotatable connection with the driven output shafts or axles 70 and 72, respectively, and are externally splined for connection with annular concentrically mounted friction packs 74 and 76, respectively, that are contained within splined counter bores 78 and 80 contained in the remote ends of the clutch members 62 and 64, respectively. As is known in the art, each friction pack includes a plurality of stacked friction plates that are alternatively nonrotatably spline-connected internally with the associated side gear and externally with the associated clutch member, respectively. Annular shims 82 and 84 are concentrically arranged about the side gears between the counter bore bottom walls and the friction packs 74 and 76, respectively, and annular thrust washers 86 and 88 are concentrically arranged about the side gears between the friction packs 74 and 76 and the adjacent wall surfaces of the differential casing 90. The casing 90 contains a conventional access opening 92 and is rotatably supported by bearing means 95 within the differential housing 96.

Figure 4:
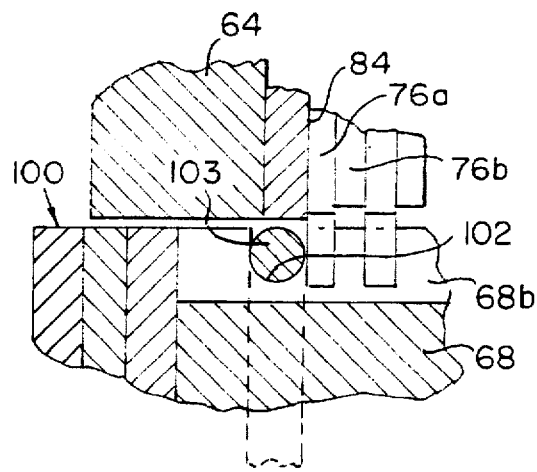
FIG. 4 is a detailed view of the side gear retaining wire means of FIG. 3.
Figure 5:
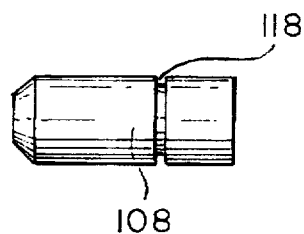
FIG. 5 is a side elevation view of the locking pin of FIG. 3.

The adjacent end surfaces of the clutch members 62 and 64 contain pairs of diametrically arranged drive grooves 92 and 94, respectively, each groove having a generally U-shaped transverse cross-sectional configuration. Mounted in the grooves is the cylindrical drive rod 97 the ends of which are mounted in corresponding opposed openings in the differential casing 90. Preferably the drive rod has a circular cross-sectional configuration. Stacks of spacer washers 98 and 100 are arranged concentrically within the clutch members 62 and 64 between the adjacent ends of the side gears 66 and 68 and the drive rod 97, thereby to limit the inward axial travel of the side gears. In order to prevent outward travel of the side gears relative to their respective clutch members, the splined outer surfaces of the side gears are provided with peripheral grooves 102 (as best shown in FIGS. 4 and 9) that receive a split wire ring 103 (FIG. 12) that abuts the adjacent friction disk 76a that is splined to the external splines 68b of the side gear 68.

Figure 7:
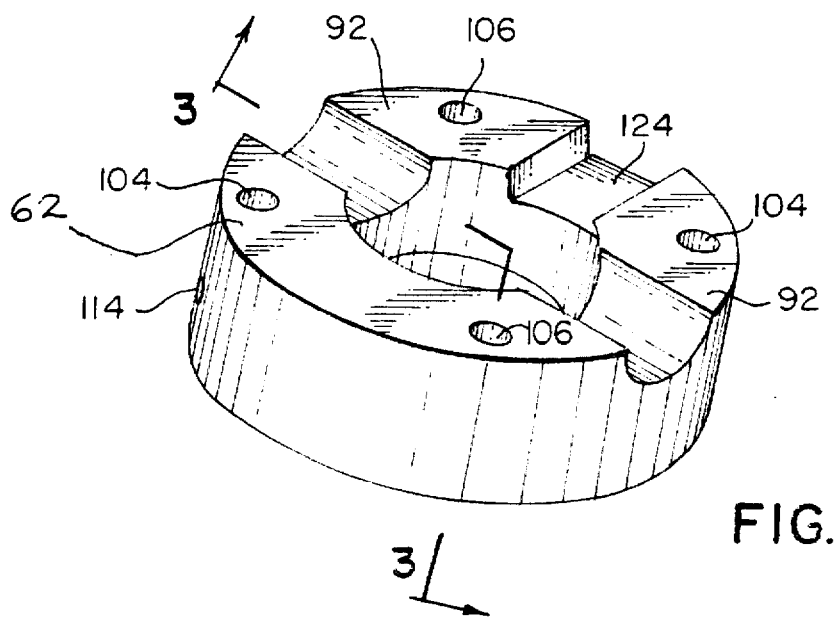

Referring to FIGS. 7 and 8, the face of the clutch member 62 adjacent the clutch member 64 contains pairs of diametrically arranged pin bores 104 and oversized spring bores 106—i.e., the diameter of the spring bores is greater than that of the pin bores. Locking pins 108 are slidably mounted at one end in said pin bores and, as shown in FIG. 3, normally extend at their other ends within the corresponding oversized bores contained in the opposing face of the clutch member 64. Similarly, a pair of locking pins slidably mounted in diametrically arranged pin bores contained in the face of the clutch member 64 extend within the oversized spring bores contained in the face of the clutch member 62. As shown in FIG. 3, each of the spring bores 106 has a first portion 106a that receives one end of an associated helical biasing spring 110, and a counter bored second portion 106b defining the oversized bore portion the receives the associated end portion of the corresponding locking pin 108. Preferably the diameter of the spring bore first portion corresponds generally with that of the helical biasing spring 110, thereby to support that end of the spring. In order to permit relative lateral movement between the spring 110 and the pin 108, a cap member 112 is proved having a circular disc portion 112a that is engaged by the associated end of the spring and isolates the spring from the pin, and a cylindrical plug portion 112b that extends with a relatively tight fit within the adjacent end of the spring 110. Preferably the diameter of the plug portion 112b increases in the direction of the disc-shaped end portion 112a.

Figure 6:
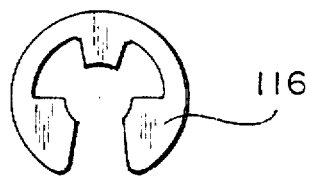
FIG. 6 is a plan view of the E-clip pin retaining clip of FIG. 3.

The locking pin 108 is axially slidably displaceable within its bore 104 between a retracted inoperable position in which the free end of the pin is withdrawn from the oversized spring bore, and the extended operable position illustrated in FIG. 3. In order to displace the pin from its retracted position toward the operable position, the clutch members are provided with radial bores 114 that communicate with the bottom regions of the pin bores 104. The locking pin is retained in the extended operable position by an E-clip retaining member 116 (FIG. 6) that extends within a corresponding groove 118 and that abuts the adjacent face of the clutch member 62.

FIG. 8 illustrates the counter bore 80 formed in the clutch member 64, the counter bore having a bottom wall 80a and an internally splined side wall 80b. FIG. 9 illustrates the internal and external splined walls 68a and 68b or the side gear 68. Both clutch members and both side gears have the same configurations, respectively.

Operation

To install the improved differential in an existing original equipment casing from which the previous components have been removed, the spring 110, cap 112, and locking pin 108 (chamfer end first) are all installed in the clutch members 62 and 64. The shims 82 and 84 and the friction packs 74 and 76 are installed from the bottoms of the clutch members, respectively, followed by the thrust washers 86 and 88. The internally splined friction plates should be aligned to ease the subsequent installation of the side gears 66 and 68. If desired, these subassembly steps could be performed at the factory.

The two clutch/side gear/friction pack sub-assemblies are then inserted one at a time into the casing chamber via the casing opening 92, the side gears being pushed apart into their respective hub pocket formed in the casing. At this point, for C-clip retained axles, the C-clips could be installed through the grooves in the clutch members. The thin spacer washers 98 and 100 are inserted through the gap between the clutch members.

In order now to compress the springs to establish the desired biasing force, the tip of a screwdriver 120 is inserted through successive pin openings 114 to displace the locking pins toward their extended operative positions, the associated E-clips 116 being manually installed to retain the pins in their extended operative positions, respectively. Finally, the clutch members are rotated until the grooves 92 and 94 are aligned, whereupon the pinion shaft is inserted through a first associated hole in the differential casing, through the grooves, and through the second associated hole in the differential casing.

The operation of this differential is the same as that of the previously described differential of the Schou U.S. Pat. No. 4,498,355.

Figure 14:
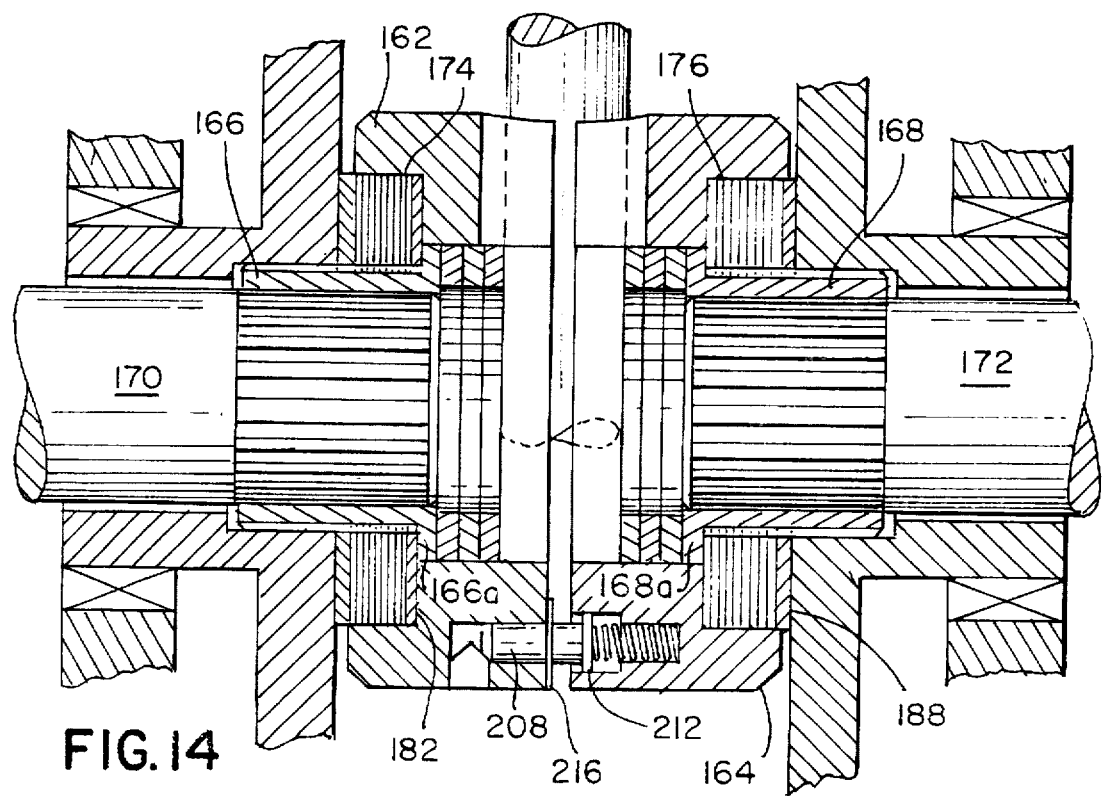
FIG. 14 is a sectional view of a second embodiment of the invention.

It should be noted that the side gears 66 and 68 of FIGS. 3 and 9 are cylindrical and, for ease of manufacture, the external splines 68b extend the length of the side gears. In the modification of FIG. 14, the side gears are provided with external integral flange portions 166a and 168a that are abutted by the friction pack assemblies 174 and 176, respectively, thereby replacing the retaining wire rings 103 of the FIG. 3 embodiment.

Figure 13:
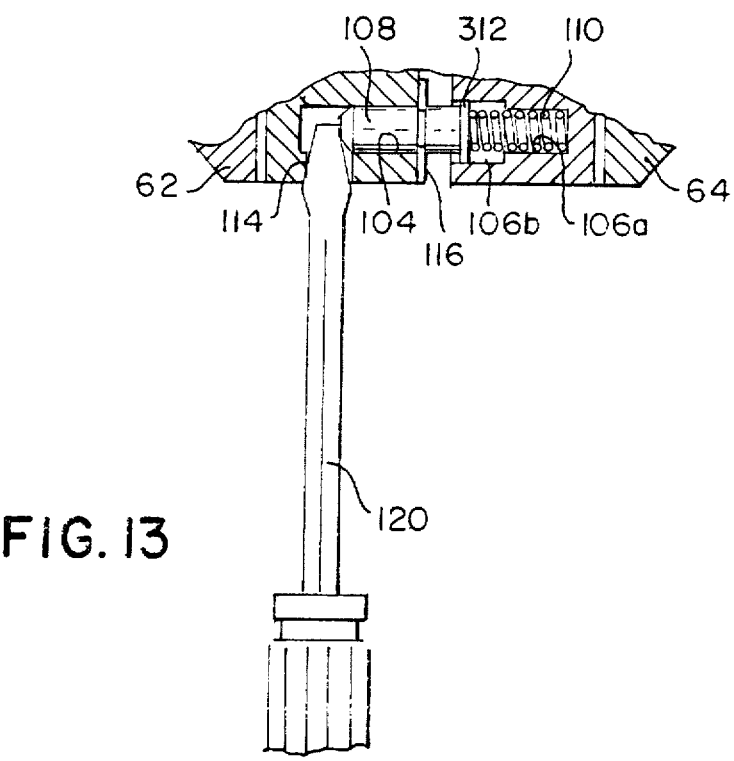
FIG. 13 is a detailed view of the manner in which the locking pin may be displaced toward its extended operative position, use being made of a spring disk between the biasing helical spring and the locking pin.

Referring again to FIG. 13, in this embodiment a simple planar spring disc 312 known in the art has been substituted for the spring cap 112 of FIGS. 3 and 10. During the assembly of this embodiment, a dab of grease is used to temporarily "glue" the disk to the end of the spring.

Finally, as shown in FIG. 7, when the differential is to be used with vehicles having C-clip retained axles, the opposed faces of the clutch members 62 and 64 may be provided with radical access grooves 124 that extend orthogonally relative to the drive grooves 92.

While in accordance with the Patent Statutes the preferred forms and embodiments of the invention have been illustrated and described, it will be apparent that other changes may be made without deviating from the invention set forth above.

What is claimed is:

1. A locking differential for driving a pair of collinearly-arranged axially-spaced output shafts the adjacent ends of which are splined and extend through aligned shaft openings contained in the opposed walls of a hollow differential casing, said casing containing an access opening affording access to the casing chamber, comprising:

(a) a pair of generally annular collinearly-arranged axially-spaced clutch members adapted for insertion within the casing chamber via the casing access opening to positions axially aligned with the axis of the casing shaft openings, the adjacent opposing faces of said clutch members containing at least one pair of diametrically arranged drive grooves;

(b) a pair of generally annular side gears collinearly arranged with, and on opposite sides of, said clutch members, said side gears being internally splined for connection with the output shafts, respectively, the remote ends of said clutch members containing counter bores having a greater diameter than the outer diameter of the side gears, the adjacent ends of said side gears extending inwardly within said counter bores, respectively, the side walls of said counter bores and the external surfaces of said side gears being splined;

(c) a pair of annular friction pack means mounted in said counter bores concentrically about said side gears, respectively, each of said friction pack means including a plurality of stacked friction discs alternate ones of which are internally spline-connected with said side gears and are externally spline-connected with said clutch member counter bore walls, respectively;

(d) means limiting the extent of outward axial displacement of said side gears relative to said friction pack means, respectively;

(e) a diametrically extending drive rod arranged between said clutch members and extending within said drive grooves, respectively, the remote ends of said drive rod extending radially outwardly beyond said clutch members for fixed connection with said differential casing, the width of said grooves being greater than the diameter of said drive rod;

(f) spacer means limiting the axial inward extent of displacement of said side gears relative to said drive rod;

(g) locking means limiting the extent of angular rotational displacement of said clutch members relative to each other; and (h) spring means biasing said clutch members outwardly apart toward the associated chamber opposed walls, respectively, thereby to compress said friction pack means to connect said clutch members with their associated side gears, respectively;

(I) said locking means including:

(1) a locking pin slidably mounted in a corresponding pin bore contained in one of said clutch member faces, said locking pin being axially slidably displaceable between extended operable and retracted inoperable positions relative to an associated oversized bore contained in the opposing face of the other of said clutch members, said spring means including a helical spring collinearly arranged in said oversized bore for cooperation with said locking pin to bias said pin toward its retracted position; and (2) releasable means for maintaining said locking pin in said extended operable position;

(j) the cross-sectional configuration of said drive grooves being such as to cause disengagement of the clutch means associated with an output shaft that overruns the other output shaft beyond a given amount, thereby to disengage the overrunning shaft and its side gear from the associated clutch member.

2. Apparatus as defined in claim 1, wherein said locking pin contains a circumferential groove; and further wherein said releasable means for maintaining said locking pin in its operable position includes a resilient generally annular split retaining clip removably mounted in said circumferential groove for engagement with said one clutch member opposed face.

3. Apparatus as defined in claim 2, wherein said one clutch member contains a radial pin access opening communicating with the bottom of said pin bore, thereby to permit manual axial displacement of said locking pin from its retracted inoperable position toward its extended operable position.

4. Apparatus as defined in claim 3, wherein the end of said locking pin adjacent the bottom of the associated bore is chamfered, thereby to permit axial displacement by the tip of a screwdriver of said locking pin toward said extended operable position.

5. Apparatus as defined in claim 2, and further including an intermediate isolating member arranged between said pin and the adjacent end of said locking pin, said isolating member having a planar surface extending normal to the axis of, and engaged by, said locking pin, thereby to permit lateral sliding movement of said pin relative to said spring.

6. Apparatus as defined in claim 5, wherein said isolating member comprises a planar disc.

7. Apparatus as defined in claim 6 wherein said disc includes a central integral plug portion that extends axially with a tight fit within the adjacent end of said spring, thereby to connect said isolating member with said spring.

8. Apparatus as defined in claim 1, wherein said side gear is generally cylindrical throughout its length; and further wherein said side gear displacement limiting means comprises for each side gear an annular retaining member mounted within a circumferential groove formed in the outer circumference of the inner end of said side gear for engagement by the end of the associated friction pack means.

9. Apparatus as defined in claim 8, wherein said retaining member comprises a C-shaped ring.

10. Apparatus as defined in claim 9, wherein said ring comprises a wire.

11. Apparatus as defined in claim 8, wherein each of said side gears includes and external integral flange portion defining said displacement limiting means.

12. Apparatus as defined in claim 1, and further including shims mounted between said friction pack means and the bottom walls of the counter bores, respectively.

13. Apparatus as defined in claim 12, and further including thrust washers arranged at the ends of said friction pack means for engagement with the adjacent casing inner wall surfaces, respectively.

14. Apparatus as defined in claim 13, wherein said thrust washers are splined to the counterbore side walls, respectively.

15. Apparatus as defined in claim 1, wherein each of said locking grooves has a generally U-shaped cross-sectional configuration.

16. Apparatus as defined in claim 1, and further including spacer means arranged between each of said side gears and said drive rods, respectively.

17. Apparatus as defined in claim 16, wherein said spacer means comprises a stack of annular spacer washers concentrically arranged within each of said clutch members, respectively.

18. Apparatus as defined in claim 1, wherein said oversized spring bore comprises the counter bore portion of a bore the diameter of which corresponds generally with the outer diameter of the associated helical spring.

* * * * *

UNITED STATES PATENT AND TRADEMARK OFFICE
CERTIFICATE OF CORRECTION

PATENT NO.   : 5,727,430
DATED        : March 17, 1998
INVENTOR(S)  : Paul J. Valente It is certified that error appears in the above-indentified patent and that said Letters Patent is hereby corrected as shown below:

Claim 5, line 2, change "pin" to:

-- spring --

Signed and Sealed this

Seventeenth Day of November, 1998

Attest:

BRUCE LEHMAN

Attesting Officer

Commissioner of Patents and Trademarks